US009185030B2

(12) United States Patent  (10) Patent No.: US 9,185,030 B2
Deshpande et al.                (45) Date of Patent:  Nov. 10, 2015

(54) VIRTUAL MACHINES IN A PACKET SWITCHING DEVICE

(75) Inventors: Akash R. Deshpande, San Jose, CA (US); John H. W. Bettink, San Jose, CA (US); Michael E. Lipman, Harvard, MA (US); Pradosh Mohapatra, Fremont, CA (US); Kannan Devarajan, Cupertino, CA (US); Prabhakara R. Yellai, Bangalore (IN); Rajagopalan M. Ammanur, San Jose, CA (US); Samir D. Thoria, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 19 days.

(21) Appl. No.: 13/329,414

(22) Filed: Dec. 19, 2011

(65) Prior Publication Data

US 2013/0114613 A1    May 9, 2013

(30) Foreign Application Priority Data

Nov. 3, 2011  (IN) .......................... 3133/DEL/2011

(51) Int. Cl.
*H04L 12/28*    (2006.01)
*H04L 12/713*   (2013.01)
*H04L 12/773*   (2013.01)

(52) U.S. Cl.
CPC .............. *H04L 45/586* (2013.01); *H04L 45/60* (2013.01)

(58) Field of Classification Search
None
See application file for complete search history.

(56) References Cited

U.S. PATENT DOCUMENTS

| 2003/0177209 | A1* | 9/2003  | Kwok et al. ................. 709/221 |
| 2008/0080512 | A1  | 4/2008  | Gofman et al. |
| 2009/0106439 | A1  | 4/2009  | Twitchell, Jr. |
| 2009/0327392 | A1* | 12/2009 | Tripathi et al. ............... 709/201 |
| 2010/0093433 | A1  | 4/2010  | Tomicic et al. |
| 2010/0287548 | A1* | 11/2010 | Zhou et al. ........................ 718/1 |
| 2010/0293543 | A1  | 11/2010 | Erhart et al. |
| 2011/0231833 | A1* | 9/2011  | Narayanan et al. ........... 717/171 |

FOREIGN PATENT DOCUMENTS

WO    WO 2011018027 A1 *   2/2011   .............. H04L 12/24

OTHER PUBLICATIONS

PCT International Search Report and the Written Opinion of the International Searching Authority for PCT Application PCT/US2012/061119 (which claims priority to U.S. Appl. No. 13/329,414), ISA/US, mailed Feb. 1, 2013 (thirteen pages).

* cited by examiner

*Primary Examiner* — Thai Nguyen
(74) *Attorney, Agent, or Firm* — The Law Office of Kirk D. Williams

(57) ABSTRACT

In one embodiment, a packet switching device creates multiple virtual packet switching devices within the same physical packet switching device using virtual machines and sharing particular physical resources of the packet switching device. One embodiment uses this functionality to change the operating version (e.g., upgrade or downgrade) of the packet switching device by originally operating according to a first operating version, operating according to both a first and second operating version, and then ceasing operating according to the first operating version. Using such a technique, a packet switching device can be upgraded or downgraded while fully operating (e.g., without having to reboot line cards and route processing engines).

12 Claims, 6 Drawing Sheets

VIRTUAL MACHINES IN A PACKET SWITCHING DEVICE

TECHNICAL FIELD

The present disclosure relates generally to packet switching devices for communicating packets in a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

From time to time, the software running in packet switching devices needs to be upgraded. However, this is problematic as taking the entire packet switch device or portions thereof offline cause packets to be lost during the upgrade process. Such upgrades impact service provider business by reducing the availability of their networks, thereby affecting the Service Level Agreements with their customers.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
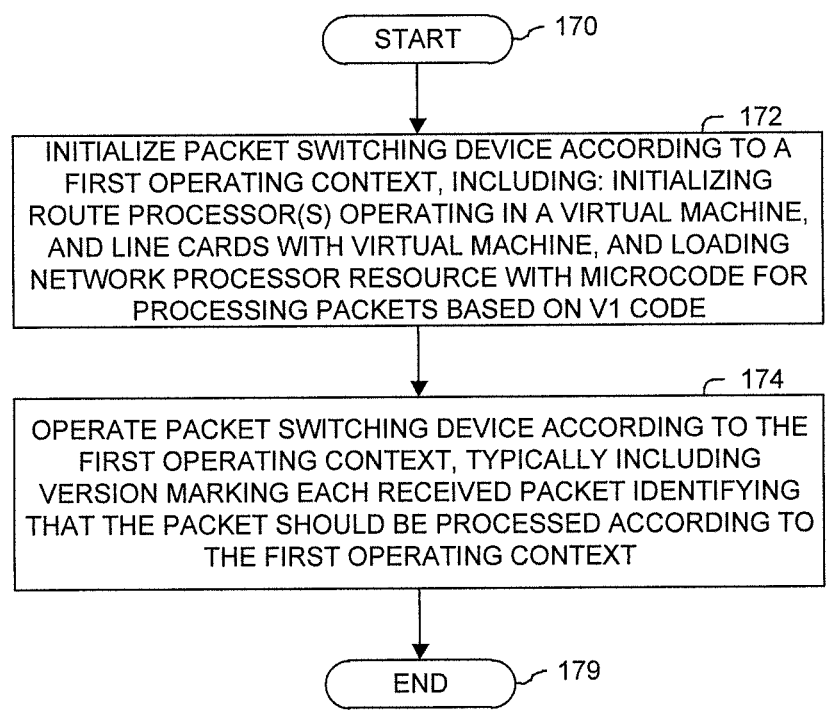
FIG. 1A illustrates a process configured to be performed, and/or performed, in one embodiment.

Disclosed are, inter alia, methods, apparatus, computer-storage media, mechanisms, and means associated with using virtual machines in a packet switching device. Such use may include, but is not limited to, using virtual machines to implement different virtual routers within a single physical packet switching device, and changing the operating version of the packet switching device.

In one embodiment, a packet switching device creates multiple virtual packet switching devices within the same physical packet switching device. These multiple virtual packet switching devices typically share particular physical resources of the packet switching device. Examples of these particular physical resources include, but are not limited to, one or more associative memories (e.g., binary or ternary content-addressable memories for identifying forwarding information), memory (e.g., for storing forwarding information bases in line cards), and traffic management resources.

In one embodiment, a second virtual packet switching device is a same operating version of a first virtual packet switching device operating in the packet switching device, but is used, for example, to packet switch different customer's packet traffic. In one embodiment, a second virtual packet switching device is a different operating version (e.g., upgrade or downgrade) of a first virtual packet switching device operating in the packet switching device. By switching the flow of packet processing from the first virtual packet switch to the second virtual packet switch, the operating version of the packet switching device can be changed without dropping or otherwise losing packets, and not requiring additional hardware (e.g., a functioning line card can be upgraded or downgraded on the same hardware without having to be restarted).

In one embodiment, a line card of the packet switching device processes received packets according to a first processing context and a second processing context. The line card operates a first virtual machine implementing a first routing instance corresponding to the first processing context, with the first routing instance performing operations including maintaining one or more forwarding data structures for use in said processing, according to the first processing context, of received packets. The line card also operates a second virtual machine implementing a second routing instance corresponding to the second processing context, with the second routing instance performing operations including maintaining one or more forwarding data structures for use in said processing, according to the second processing context, of received packets. In one embodiment, the first and second forwarding contexts refer to different versions of a forwarding instance. In one embodiment, the first and second forwarding contexts refer to same versions of a forwarding instance.

In one embodiment, the packet switching devices changes the operating version of the line card from a first operating version to a second operating version without restarting the line card. In one embodiment, the line card initially operates the first virtual machine. Subsequently, the line card simultaneously operates the first virtual machine and the second virtual machine. The line card then ceases operating the first virtual machine. In one embodiment, received packets are not dropped due to said changing the operating version of the line card from the first operating version to the second operating version without restarting the line card.

In one embodiment, a packet switching device operates according to first and second operating versions. The packet switching device operating according to a first operating version includes: operating a first routing instance on a first virtual machine on each of a plurality of line cards to maintain a first forwarding information base, operating one or more network processors on each of the plurality of line cards according to a first operating version of the network processor and to forward packets according to the first forwarding information base, and operating a first route processor virtual machine to maintain a first routing information base based on routing information packets exchanged with other packet switching devices and to update the first routing instance with forwarding information from first routing information base. The packet switching device operating according to a second operating version includes: operating a second routing instance on a second virtual machine on each of a plurality of line cards to maintain a first forwarding information base, operating one or more network processors on each of the plurality of line cards according to a second operating version of the network processor and to forward packets according to the second forwarding information base, and operating a second route processor virtual machine to maintain a second routing information base based on routing information packets exchanged with other packet switching devices and to update the second routing instance with forwarding information from second routing information base.

One embodiment uses these first and second operating versions to change the operating version of the packet switching device without having to restart the packet switching device. In one embodiment, the packet switching device changes the operating version of the packet switching device from a first operating version to a second operating version, which includes: initially said operating the packet switching device according to the first operating version; then simultaneously said operating the packet switching device according to the first operating version and said operating the packet switching device according to the second operating version; and ceasing said simultaneously operating the packet switching device according to the first operating version and said operating the packet switching device according to the second operating version including by ceasing said operating the packet switching device according to the first operating version.

One embodiment includes marking received packets during said simultaneously said operating the packet switching device according to the first operating version and said operating the packet switching device according to the second operating version with an indication of which version of the first and second operating versions they should respectively be processed by the packet switching device, and correspondingly processing said marked received packets. In one embodiment, the packet switching device does not drop or otherwise lose packets due to changing the operating version of the packet switching device from the first operating version to the second operating version. One embodiment synchronizes at least a portion of the second routing information base from the first routing information base.

2. Description

Disclosed are, inter alia, methods, apparatus, computer-storage media, mechanisms, and means associated with using virtual machines in a packet switching device. Such use may include, but is not limited to, using virtual machines to implement different virtual routers within a single physical packet switching device, and changing the operating version of the packet switching device. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the teem "particular machine," when recited in a method claim for performing steps, refers to a particular machine within the 35 USC §101 machine statutory class.

Expressly turning to the figures, FIG. 1A illustrates a process performed in one embodiment. Processing begins with process block 170. In process block 172, the packet switching device is initialized according to a first operating context. Note, an operating context includes an operating version of the packet switching device, and typically particular information for forwarding corresponding customer traffic. This initialization typically includes: initializing one or more route processors to operate in one or more virtual machines, initializing line cards to operate its forwarding information management and possibly other functionality in a virtual machine, and initializing one or more resources on a line card. In one embodiment, one or more network processors are loaded with microcode for processing packets according to this operating version. Next, in process block 174, the packet switching device is operated according to the first operating context. In one embodiment, received packets are marked with a version (i.e., identification of the operating context) for which the received packet should be processed by the packet switching device. Processing of the flow diagram of FIG. 1A is complete as indicated by process block 179.

Figure 1B:
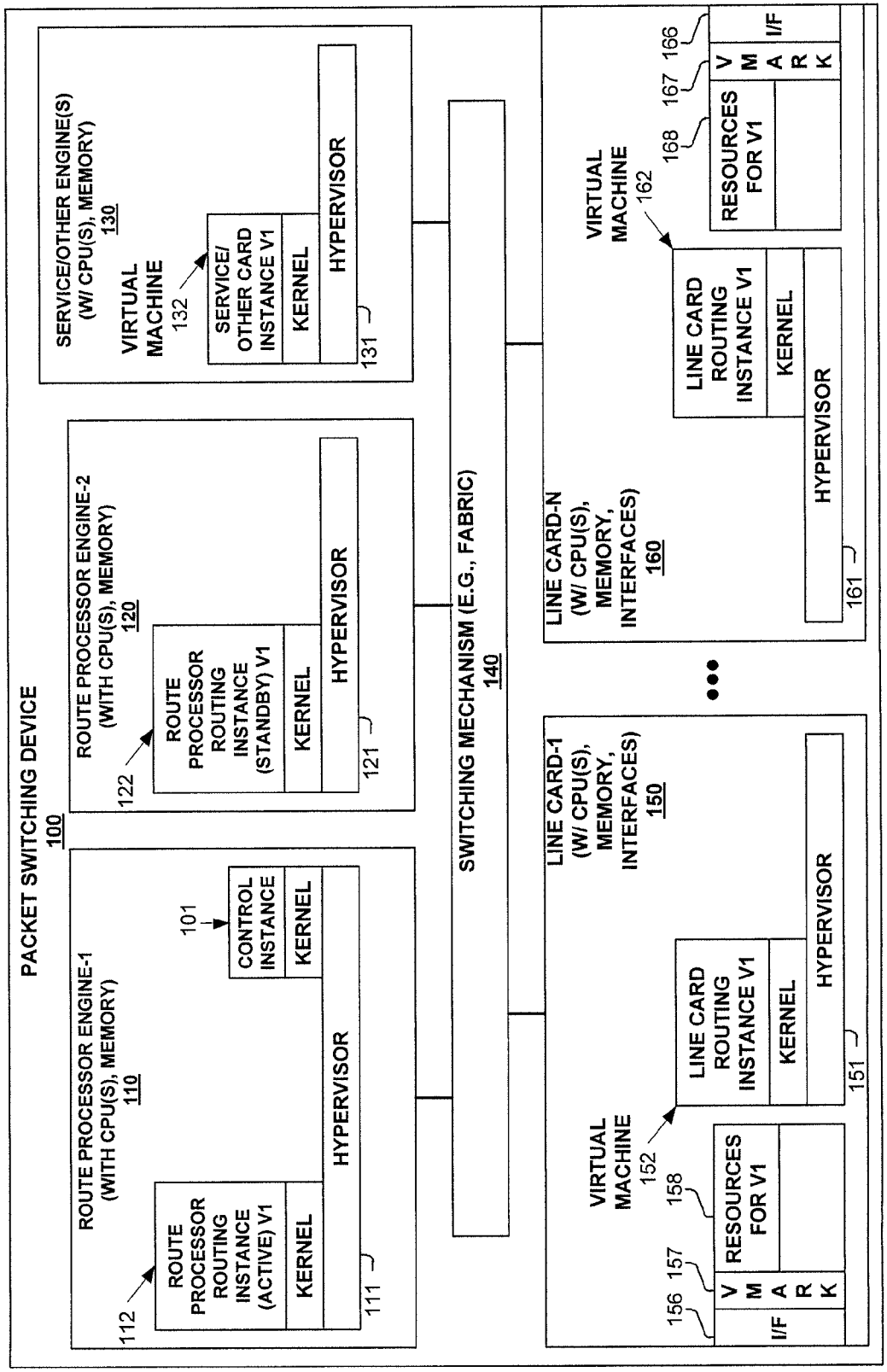
FIG. 1B illustrates a packet switching device configured to operate, and/or operating, according to one embodiment.

FIG. 1B illustrates packet switching device 100 configured to operate, and/or operating, according to one embodiment. As shown, packet switching device 100 includes a route processor engine 110, multiple line cards 150 and 160 (representing any number of line card), and a switching mechanism 140 (e.g., switch fabric, crossbar, bus) for communicating packets and other information within packet switching device 100. A typical configuration of packet switching device 100 typically includes a second route processor engine 120 (for redundancy purposes—hence one is active and one is standby), and one or more service or other engines 130 for performing packet services and/or other functionality.

As shown in FIG. 1B, packet switching device 100 is configured to operate or is operating according to a first packet switching context. Each of route processor engines 110 and 120, service engine(s) 130, and line cards 150 and 160 includes one or more processing elements and memory configured to operate virtual machines (e.g., on top of hypervisors 111, 121, 131, 151, and 161, respectively).

Route processor engines 110 and 120 instantiate their respective route processor routing instances (on top of a kernel) 112 and 122 (i.e., instantiate virtual machines 112 and 122). These perform the typical functionality of a route processor in a packet switching device, such as, but not limited to, exchanging routing information packets with other packet switching devices in maintaining a routing information base, and from there, deriving forwarding information which is provided to each of line cards 150, 160. Additionally, shown is control in route processor engine 110 is control instance 101 operating to control the switching of the operating version of packet switching device 100 as described herein. Note, one embodiment includes a control instance on each route processor engine 110, 120 for redundancy purposes. In one embodiment, control instance 101 is located on another component of packet switching device 100.

Service/other engine(s) 130 instantiate their respective service processing instances (on top of a kernel) 132 (i.e., instantiate virtual machine 132) for performing the typical functionality of a service or other card.

Line cards 150 and 160 instantiate their respective line card routing instances (on top of a kernel) 152 and 162 (i.e., instantiate virtual machines 152 and 162). These perform the typical functionality of line card control functionality, such as, but not limited to, communicating with a route processor engine 110, 120 to exchange information, including receiving information and to populate one or more forwarding information bases (e.g., within resources 158, 168, respectively), as well as other functionality such as controlling resources to perform quality of service, traffic management, scheduling, statistics collection, etc. As further shown, line cards 150 and 160 each include interfaces (156, 166, respectively) for sending and receiving packets; version marking functionality (157, 167, respectively) for marking received packets in order to identify an operating context in which to process the received packet; and physical resources (158, 168, respectively) such as, but not limited to, one or more associative memories (e.g., binary or ternary content-addressable memories for identifying forwarding information), memory (e.g., for storing forwarding information bases in line cards), and traffic management resources.

Figure 1C:
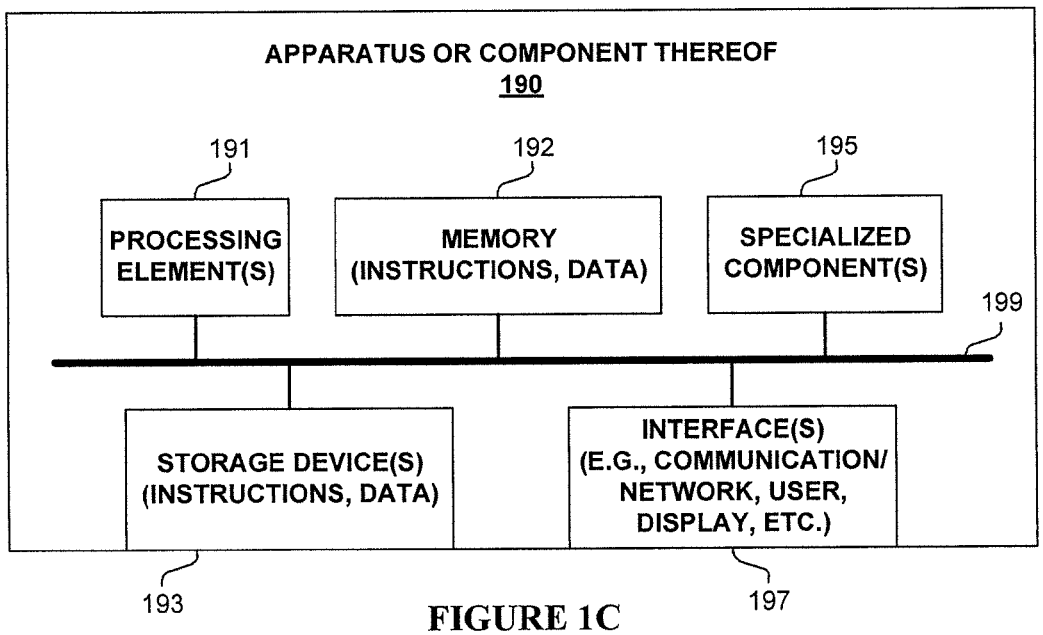
FIG. 1C illustrates an apparatus or component configured to operate, and/or operating, according to one embodiment.

FIG. 1C illustrates an apparatus or component 190 configured to operate, and/or operating, according to one embodiment associated with the use of virtual machines in a packet switching device. In one embodiment, apparatus or component 190 performs one or more processes corresponding to one of the flow diagrams illustrated or otherwise described herein, and/or illustrated in another diagram or otherwise described herein.

In one embodiment, apparatus or component 190 includes one or more processing element(s) 191, memory 192, storage device(s) 193, specialized component(s) 195 (e.g. optimized hardware such as for performing operations, etc.), and interface(s) 197 for communicating information (e.g., sending and receiving packets, user-interfaces, displaying information, etc.), which are typically communicatively coupled via one or more communications mechanisms 199, with the communications paths typically tailored to meet the needs of a particular application. In one embodiment, apparatus or component 190 corresponds to, or is part of, packet switching device 100 of FIG. 1B, 2B and/or 2C.

Various embodiments of apparatus or component 190 may include more or fewer elements. The operation of apparatus or component 190 is typically controlled by processing element(s) 191 using memory 192 and storage device(s) 193 to perform one or more tasks or processes. Memory 192 is one type of computer-readable/computer-storage medium, and typically comprises random access memory (RAM), read only memory (ROM), flash memory, integrated circuits, and/or other memory components. Memory 192 typically stores computer-executable instructions to be executed by processing element(s) 191 and/or data which is manipulated by processing element(s) 191 for implementing functionality in accordance with an embodiment. Storage device(s) 193 are another type of computer-readable medium, and typically comprise solid state storage media, disk drives, diskettes, networked services, tape drives, and other storage devices. Storage device(s) 193 typically store computer-executable instructions to be executed by processing element(s) 191 and/or data which is manipulated by processing element(s) 191 for implementing functionality in accordance with an embodiment.

Figure 2A:
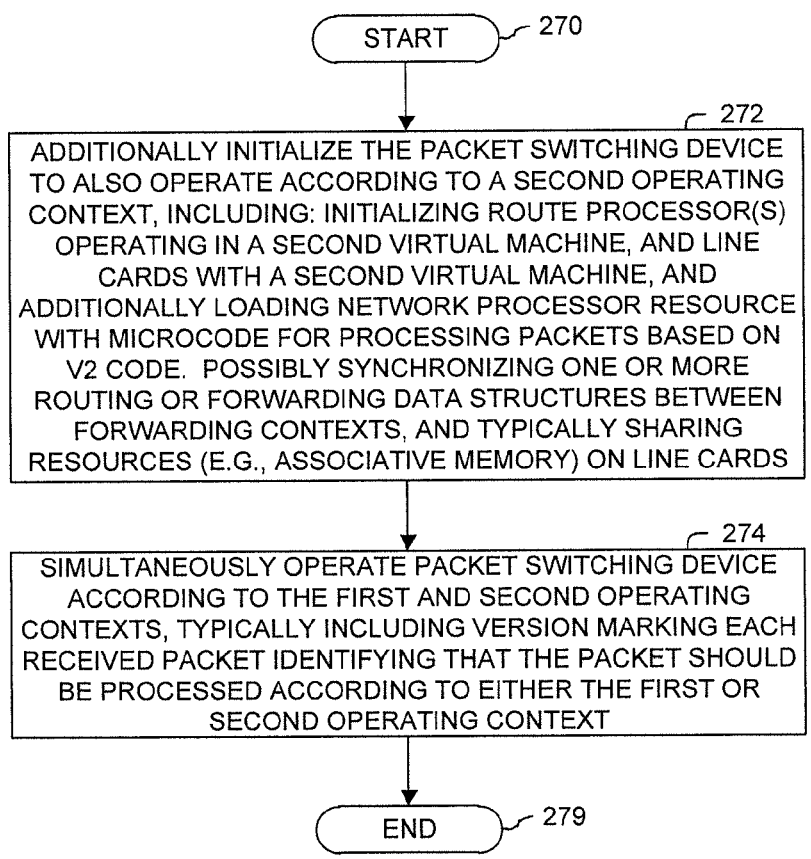
FIG. 2A illustrates a process configured to be performed, and/or performed, in one embodiment.

FIG. 2A illustrates a process performed in one embodiment. Processing begins with process block 270. In process block 272, the packet switching device is configured to also operate according to a second operating context. In one embodiment, this includes initializing one or more route processors operating in a second virtual machine, one or more service/other engines operating a second virtual machine, and line cards operating with a second virtual machine. Additionally, network processor(s) are loaded with a second version of microcode for processing packets in the second forwarding context. Additional resources are initialized according to the second operating context. In one embodiment, the routing information base (and/or other data structures) of the second forwarding context is synchronized with that of the first forwarding context so that the second forwarding context does not need to independently derive this information.

As represented by process block 274, the packet switching device simultaneously operates according to the first and second forwarding contexts. In one embodiment, routing information packets received from other packet switching devices are processed by route processors in both forwarding contexts. In one embodiment, routing information packets received from other packet switching devices are processed by route processor(s) in a single forwarding context, with this information possibly communicated and/or synchronized with that in the other forwarding context. In one embodiment, received packets are marked by the packet switching device according to which forwarding context that is to be used to process the received packets. Processing of the flow diagram of FIG. 2A is complete as indicated by process block 279.

Figure 2B:
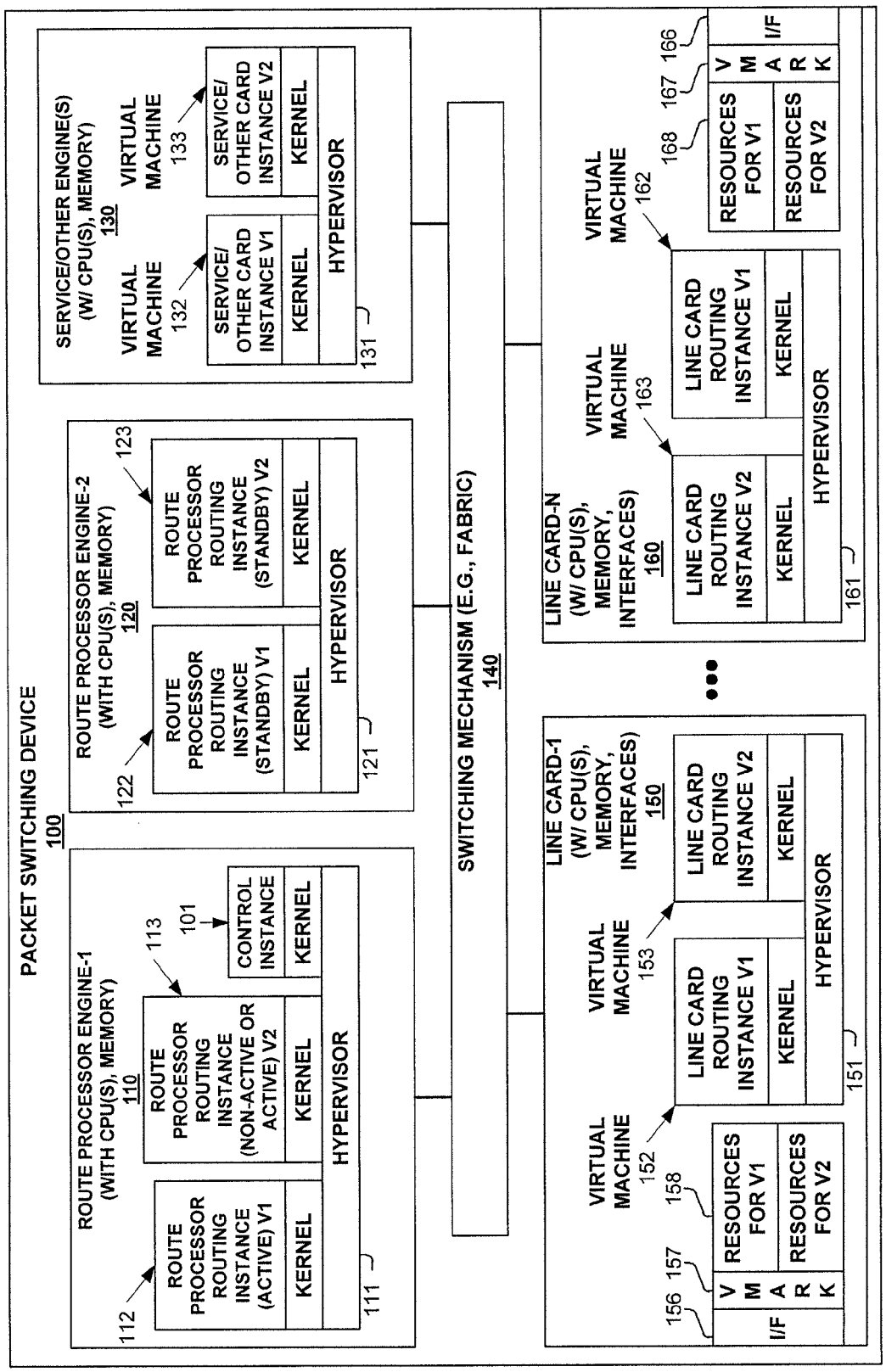
FIG. 2B illustrates a packet switching device configured to operate, and/or operating, according to one embodiment.

FIG. 2B illustrates a packet switching device 100 configured to operate, and/or operating, according to one embodiment. FIG. 2 illustrates packet switching device 100 operating a second operating context in addition to the operating according to a first operating context as described in relation to FIG. 1B. Thus, additionally shown in FIG. 2B are: route processor routing instance (on top of a kernel) 113 (e.g., virtual machine 113) operating on route processing engine 110; route processor routing instance (on top of a kernel) 123 (e.g., virtual machine 123) operating on route processing engine 120; service/other instance (on top of a kernel) 133 (e.g., virtual machine 133) operating on service/other engine 130; line card routing instance (on top of a kernel) 153 (e.g., virtual machine 153) operating in line card 150; and line card routing instance (on top of a kernel) 163 (e.g., virtual machine 163) operating in line card 160. Additionally, resources 158 are shared (e.g., typically partitioned) among the operating contexts.

Further, version marking functionality (157, 167, respectively of line cards 150 and 160) are configured for marking received packets according to the first and/or second operating context. One embodiment of a packet switching devices uses a distributed architecture, and it is desirable that both ingress and egress line cards process a packet according to a same operating context. For example, the format of the internal information associated with the packet may be different in different operating contexts or forwarding databases might be slightly different; and by processing a packet throughout the packet switching device according to a same processing context alleviates any issue caused by any disparities between operating contexts.

In one embodiment, wherein the first and second operating contexts correspond to different customer networks (or other entities or partitioning mechanisms) which are meant to simultaneously operate for a long duration, the marking of which operating context is typically determined on which interface (e.g., port) on which the packet is received. In one embodiment, which is using these virtual machines to change the operating version of packet switching device 100, packets are marked for processing according to the first operating context until the second operating context is operating to a certain level, at which point, control instance 101 issues a cut-over command to switch to the second operating context, and newly received packets are marked as such. Thus, residual packets marked for the first operating context can be processed throughout packet switching device 100 accordingly during this version transition period, while newly received packets are processed according to the second processing context. Note, in one embodiment, certain resources may not be shared among multiple forwarding contexts, and thus, in response to the cut-over command, they are flashed or otherwise quickly converted according to the second operating context.

Figure 3A:
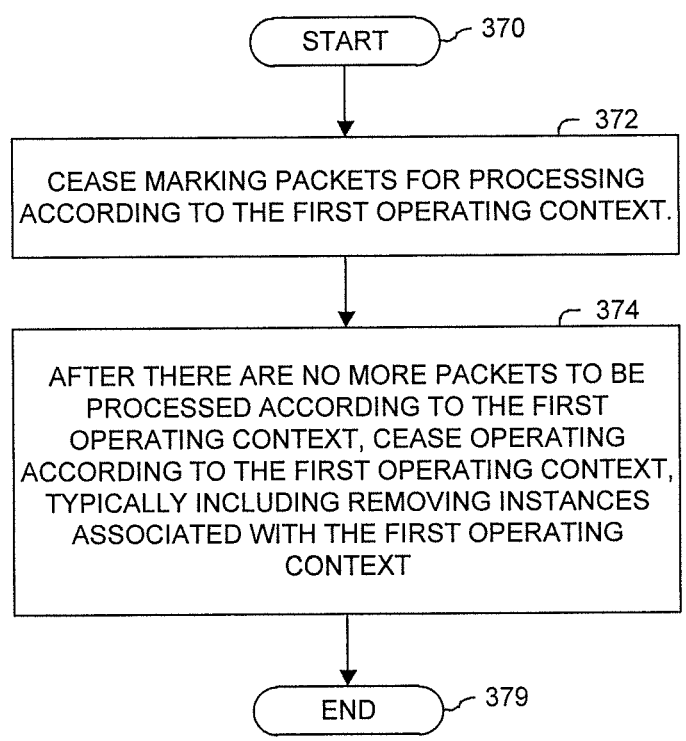
FIG. 3A illustrates a process configured to be performed, and/or performed, in one embodiment.

FIG. 3A illustrates a process performed in one embodiment that is transitioning from a first operating context to a second operating context using virtual machines as described herein. Processing begins with process block 370. In process block 372, packets are no longer marked for processing according to the first operating context, but only for the new, second operating context. In process block 374, after there are no more packets to be processed according to the first operating context (which typically can be determined by the expiration of a transition timer or other monitoring mechanism), then the packet switching device ceases operating according to the first operating context. This typically includes ceasing the operating of virtual machines/instances associated with the first operating context, and possibly freeing partitions of resources dedicated to the first operating context. Processing of the flow diagram of FIG. 3A is complete as indicated by process block 379.

Figure 3B:
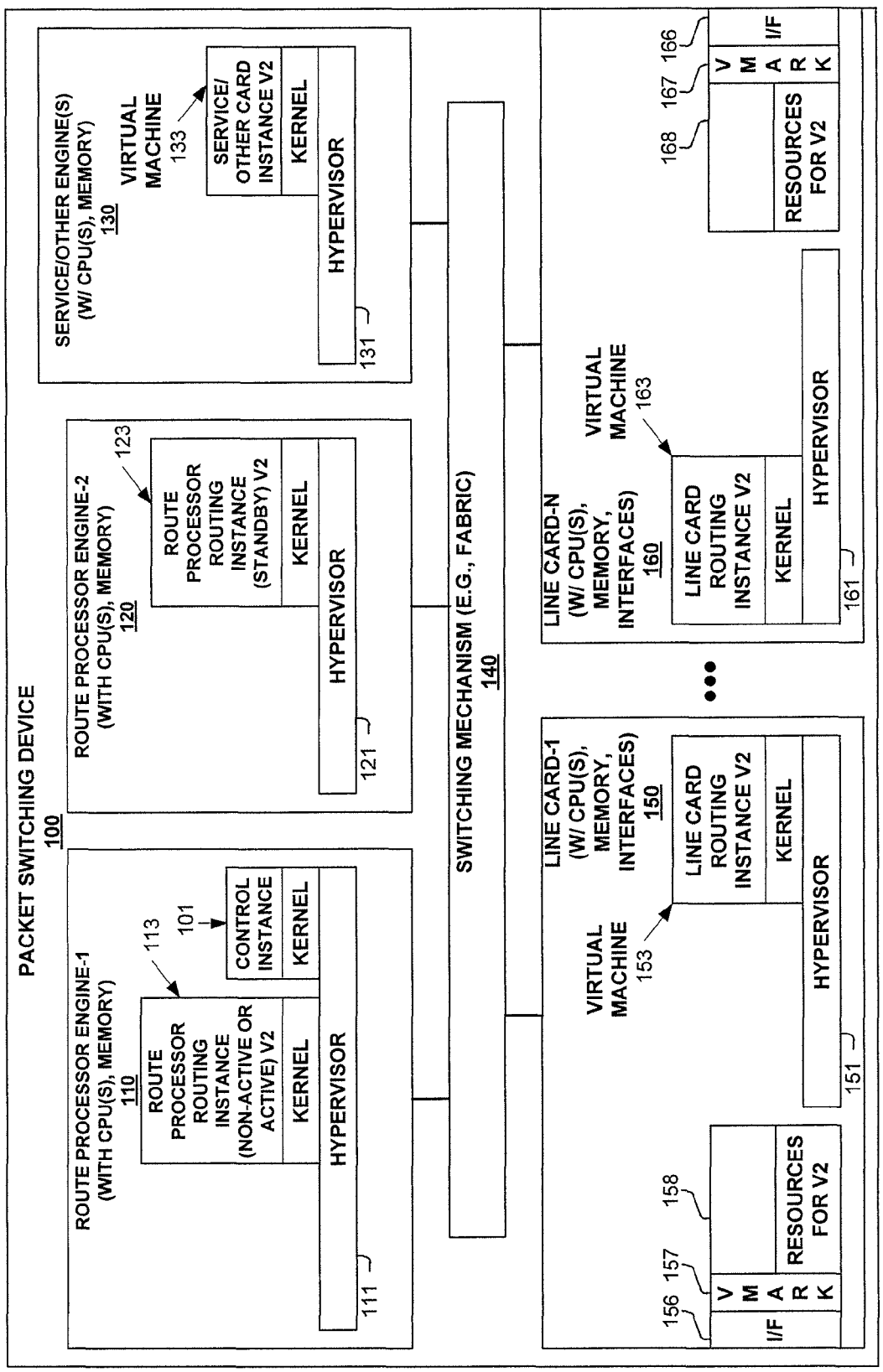
FIG. 3B illustrates a packet switching device configured to operate, and/or operating, according to one embodiment.

FIG. 3B illustrates a packet switching device 100 configured to operate, and/or operating, according to one embodiment. FIG. 3B illustrates packet switching device 100 operating a second operating context without operating according to a first operating context as described in relation to FIG. 2B. Thus, virtual machines 113, 123, 133, 153 and 163 associated with the second operating context are shown, and virtual machines 112, 122, 132, 152 and 162 associated with the first operating context shown in FIGS. 1B and 2B are not shown. Additionally, resources 158 are no longer used for processing according to the first operating context, but rather for the second operating context. Received packets are marked for processing according to the second operating context. Note, one embodiment provides for returning to only operating according to the first forwarding context (e.g., transitioning from packet switching device 100 shown in FIG. 2B to that of FIG. 1B—instead of that shown in FIG. 2B to that of FIG. 3B) such as for testing purposes or if there is a problem with operating according to the second forwarding context.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

operating a physical packet switching device according to a first operating version, wherein the physical packet switching device includes a plurality of physical line cards with each of the plurality of physical line cards including interfaces for sending and receiving packets and a physical network processor processing packets according to microcode and a processor performing line card control, a physical route processor engine deriving and providing forwarding information to each of the plurality of physical line cards; and a physical switching fabric or crossbar communicatively coupling the plurality of physical line cards, including communicating packets among the plurality of line cards, and the physical route processor engine; and said operating the physical packet switching device according to the first operating version includes: operating a first routing instance on a first virtual machine on each of said processors performing line card control to maintain a first forwarding information base, operating said physical network processors according to said microcode according to the first operating version to forward packets according to the first forwarding information base, and operating a first route processor virtual machine on the physical route processor engine to maintain a first routing information base based on routing information packets exchanged with other packet switching devices and to update said first routing instances with first forwarding information from first routing information;

wherein the method includes: simultaneously operating the physical packet switching device according to the first operating version and a second operating version; and marking each particular packet of a plurality of packets processed by said network processors on the plurality of line cards with an indication of which version of the first and second operating versions that said particular packet was processed, and correspondingly processing by the physical packet switching device said particular packet according to said marking.

2. The method of claim 1, further comprising: in-service upgrading of the physical packet switching device from the first operating version to the second operating version, which includes: subsequent to said operating the physical packet switching device according to the first operating version: additionally and said simultaneously operating the physical packet switching device according to the second operating version, which includes operating a second routing instance on a second virtual machine on each of said processors performing line card control to maintain a second forwarding information base, operating said physical network processors according to said microcode according to the first operating version and additional microcode according to the second operating version to forward packets according to both the first forwarding information base and the second forwarding information base, and operating a second route processor virtual machine on the physical route processor engine to maintain a second routing information base based on said routing information packets exchanged with other packet switching devices and to update said second routing instances with forwarding information from second routing information; and ceasing said forwarding packets according to the first forwarding information base, ceasing the first virtual machine on each of said processors performing line card control, and ceasing the first route processor virtual machine on the physical route processor engine.

3. The method of claim 2, wherein the physical packet switching device does not drop or otherwise lose packets due to changing the operating version of the packet switching device from the first operating version to the second operating version.

4. The method of claim 2, including synchronizing at least a portion of the second routing information base from the first routing information base.

5. The method of claim 2, wherein the physical packet switching device does not drop or otherwise lose packets due to changing the operating version of the packet switching device from the first operating version to the second operating version.

6. The method of claim 2, including synchronizing at least a portion of the second routing information base from the first routing information base.

7. A physical packet switching device, comprising:
a plurality of physical line cards with each of the plurality of physical line cards including interfaces configured for sending and receiving packets;
a physical network processor configured to process packets according to microcode;
a processor configured to perform line card control;
a physical route processor engine configured to derive and provide forwarding information to each of the plurality of physical line cards; and
a physical switching fabric or crossbar configured to communicatively couple the plurality of physical line cards and the physical route processor engine, including for communicating packets among the plurality of line cards and the physical route processor engine;

wherein the physical packet switching device is configured to operate according to a first operating version, which includes: operating a first routing instance on a first virtual machine on each of said processors performing line card control to maintain a first forwarding information base, operating said physical network processors according to said microcode according to the first operating version to forward packets according to the first forwarding information base, and operating a first route processor virtual machine on the physical route processor engine to maintain a first routing information base based on routing information packets exchanged with other packet switching devices and to update said first routing instances with forwarding information from first routing information;

wherein the physical packet switching device is configured to: simultaneously operate the physical packet switching device according to the first operating version and a second operating version, and to mark each particular packet of a plurality of packets processed by said network processors on the plurality of line cards with an indication of which version of the first and second operating versions that said particular packet was processed, and correspondingly process said particular packet according to said marking.

8. The physical packet switching device of claim 7, wherein the physical packet switching device is configured to perform in-service upgrading of the physical packet switching device from the first operating version to the second operating version, which includes: subsequent to said operating the physical packet switching device according to the first operating version: additionally and said simultaneously operating the physical packet switching device according to the second operating version, which includes operating a second routing instance on a second virtual machine on each of said processors performing line card control to maintain a second forwarding information base, operating said physical network processors according to said microcode according to the first operating version and additional microcode according to the second operating version to forward packets according to both the first forwarding information base and the second forwarding information base, and operating a second route processor virtual machine on the physical route processor engine to maintain a second routing information base based on said routing information packets exchanged with other packet switching devices and to update said second routing instances with forwarding information from second routing information; and ceasing said forwarding packets according to the first forwarding information base, ceasing the first virtual machine on each of said processors performing line card control, and ceasing the first route processor virtual machine on the physical route processor engine.

9. The physical packet switching device of claim 8, wherein the physical packet switching device is configured not to drop or otherwise lose packets due to changing the operating version of the packet switching device from the first operating version to the second operating version.

10. The physical packet switching device of claim 8, wherein the physical packet switching device is configured to synchronize at least a portion of the second routing information base from the first routing information base.

11. The physical packet switching device of claim 8, wherein the physical packet switching device is configured not to drop or otherwise lose packets due to changing the operating version of the packet switching device from the first operating version to the second operating version.

12. The physical packet switching device of claim 8, wherein the physical packet switching device is configured to synchronize at least a portion of the second routing information base from the first routing information base.

\* \* \* \* \*